(12) United States Patent
Angelsen et al.

(10) Patent No.: US 6,540,677 B1
(45) Date of Patent: Apr. 1, 2003

(54) ULTRASOUND TRANSCEIVER SYSTEM FOR REMOTE OPERATION THROUGH A MINIMAL NUMBER OF CONNECTING WIRES

(76) Inventors: Bjorn A. J. Angelsen, Bugges veg 4B, N-7051 Trondheim (NO); Tonni F. Johansen, Osloveien 6, N-7018 Trondheim (NO)

( * ) Notice: Subject to any disclaimer, the term of this patent is extended or adjusted under 35 U.S.C. 154(b) by 0 days.

(21) Appl. No.: 10/000,669

(22) Filed: Nov. 15, 2001

Related U.S. Application Data (60) Provisional application No. 60/249,470, filed on Nov. 17, 2000.

(51) Int. Cl.[7] .............................................. A61B 8/00
(52) U.S. Cl. ....................... 600/437; 310/314; 310/317; 367/117; 367/121; 367/122
(58) Field of Search ................. 600/437; 310/314–317; 367/117–130

(56) References Cited

U.S. PATENT DOCUMENTS 4,821,706 A * 4/1989 Schleicher et al. ......... 600/437
5,592,031 A * 1/1997 Ramos Fernandez et al. ... 307/112

* cited by examiner

*Primary Examiner*—Francis J. Jaworski
*Assistant Examiner*—William C Jung
(74) *Attorney, Agent, or Firm*—Cohen, Pontani, Lieberman & Pavane (57) ABSTRACT

An advantageous combination of preamplifier electronics and circuits for acoustic beam forming with ultrasound transducer arrays permits integration of the electronics and transducer(s) at close distances in a compact arrangement and is operable from an ultrasound imaging or measurement system using only a minimal number of connecting electric wires. To achieve dynamic focusing of the receive beam with a transducer array, an integrated electronic circuit mounted in close proximity to the transducer array provides preamplifiers for the individual elements and delay circuits that are automatically switched in a predetermined time sequence after transmission of an imaging pulse. When a high voltage pulse is transmitted via the cable, a break-through circuit connects the cable to the transducer for transmission of the ultrasound pulse, while in receive mode the low level signal on the transducer is amplified and fed as a higher level signal via the same cable to the imaging or measurement instrument.

41 Claims, 8 Drawing Sheets

ULTRASOUND TRANSCEIVER SYSTEM FOR REMOTE OPERATION THROUGH A MINIMAL NUMBER OF CONNECTING WIRES

This application claims benefit of provisional application 60,249,470 filed Nov. 17, 2000.

BACKGROUND OF THE INVENTION

1. Field of the Invention

The present invention, relates to high resolution ultrasound imaging of small structures at high frequencies, typically above 5 MHz, where the ultrasound transducer or transducer array is brought close to the structure to be imaged through channels with limited space for cable wires connecting the ultrasound transducer(s) and the ultrasound imaging or measurement instrument.

Examples of such applications are intravascular ultrasound imaging (IVUS) of a vessel wall from a transducer at the tip of a catheter, intraurether imaging of the prostate, or high resolution imaging of tumors and small vessels during minimal invasive or other surgery through narrow channels. The invention presents solutions with particularly high signal to noise ratio of the measured back scattered signal, with high inertness to electromagnetic interference from external sources, in such situations.

More specific, the invention relates to a design of preamplifier electronics, circuits for acoustic beam forming with ultrasound transducer arrays, ultrasound transducer arrays, and combinations thereof, that allows the electronics and transducer(s) to be integrated with short distance in a compact assembly, that can be operated from an ultrasound imaging or measurement system with a small number of electric wires, down to a two-wire cable.

The invention also has applications for obtaining maximal signal to noise ratio and inertness to electromagnetic interference with high frequency ultrasound imaging of structures with simpler access, such as high resolution skin or eye imaging (f~20–100 MHz).

It further has applications with lower frequency imaging and measurements for transducer arrays with small elements with high electric impedance, to improve the signal to noise ratio and the inertness to electromagnetic interference in these cases. It also has applications for switched elevation focusing with linear arrays, to reduce the number of wires connecting to the instrument, for easier manual operation of the transducer array.

2. Description of the Related Art

The spatial resolution with ultrasound echo imaging systems is a couple of ultrasound wavelengths large. The ultrasound wavelength, $\lambda$, is related to the ultrasound frequency, f, as $\lambda = c/f$, where $c \sim 1540$ $\mu m/\mu s$ is the propagation velocity of ultrasound in the tissue. To obtain a low wavelength, and hence a sharp resolution, one must therefore use a high ultrasound frequency. However, the image depth with ultrasound echo imaging is limited by absorption of ultrasound energy in the tissue. As the absorption increases with frequency, this sets an upper limit on the frequency that can be used for a given image depth. The image resolution is therefore limited by the image depth.

For imaging of small structures like the vessel wall, or other small structures of internal organs, it is therefore necessary to bring the ultrasound transducer close to the structure, so that the image depth, and hence the absorption attenuation of the ultrasound, is limited. With image depths less than 10 mm, it is possible to use ultrasound frequencies in the 20–100 MHz range, with wave lengths ranging from 75 to 15 $\mu m$. This gives spatial resolution in the range of around 150 $\mu m$ to 30 $\mu m$, depending on the transducer frequency, bandwidth, and aperture.

The ultrasound transducer can be brought close to internal structures in the body, like the vessel wall or other organs, by mounting the transducer structure at the tip of a catheter or other elongated devices, that are inserted into the body through an incisure or natural body openings. A cable then connects the transducer at the tip of the extended probe and the ultrasound imaging or measurement instrument. The use of such high frequencies with transducers that has a distance to the imaging instrument then introduces practical problems, as:

1. With ultrasound frequencies above 30 MHz, impedance mismatch between the transducer and the cable connecting to the imaging instrument introduces losses that limits the signal to noise ratio and hence the maximal image depth at a given frequency. The limited thickness of the insertion instrument also limits the thickness of the wires that connects the transducer and the imaging instrument giving additional absorption and reduced imaging sensitivity.
2. At for example 35 MHz, the electromagnetic wavelength in the cable is ~6 m, giving a quarter wavelength of ~1.5 m that is approximately the length of a typical catheter. The catheter hence becomes similar to a quarter wave tuned antenna in the ultrasound receiver frequency range, and the imaging system becomes very sensitive to external electromagnetic interference (EMI) sources in the active receiver frequency range.
3. Other problems in using a thin cable between the ultrasound transducer and the instrument is related to obtaining narrow ultrasound beams. To reduce the effect of ultrasound wave diffraction in the beam focus, and hence reduce the focal diameter, one must have a large number of wavelengths across the active transducer aperture (typically ~50 wavelengths across the aperture are wanted). However, with such low diffraction focusing, the depth of the focus is reduced, limiting the range of sharp focusing and spatial resolution.
   The standard solution to this problem for the receive beam, is to use an array of transducer elements with dynamic focusing where the receive beam focus follows the depth where the echoes are received from at any time. An electronically steered dynamic focus is obtained by adding delays to each array element signal, so that the total of this delay and the propagation delay from the focus to the element, is close to the same for all elements. The added delay can be obtained with acoustic or electronic delay lines, or a combination of both. One also wants to increase the active transducer transmit aperture with image depth, in order to limit expansion of the focal diameter with depth.
4. For pulse transmission one must select a fixed transmit beam focus, as one cannot change the pulse after it is transmitted. It is then desirable to be able to select between different transmit focus depths so that one can focus the transmit beam to the most important image range. A kind of dynamic focus for the transmit beam can be obtained by composing the whole image range of sub ranges where each sub range is imaged with separate transmit pulses focused within the sub range. One also wants to increase the active transducer transmit aperture with image depth, in order to limit expansion of the focal diameter with depth.

Hence, it is desirable to have a transducer array at the distal end of the insertion device that operates with a high signal to noise ratio with large immunity to electromagnetic interference, the array having dynamic or switchable receive focusing and expanding receive aperture, switchable transmit focusing and expanding transmit aperture, that can be operated from the ultrasound imaging or measurement instrument via a minimal number of wires, minimizing the cross section of the device to be inserted into narrow structures.

SUMMARY OF THE INVENTION

The invention devices a solution to these problems by mounting electronic circuits close to the ultrasound transducer or transducer array, where the circuits have the ability to be operated through a few wires, down to a two-wire cable.

In its simplest form, the invention provides a preamplifier that can be operated through a two wire cable that provides the DC bias voltage to the amplifier. When a high voltage pulse is transmitted via the wire, a breakthrough circuit connects the wire to the transducer for transmit of the ultrasound pulse, while in receive mode, the low level signal on the transducer is amplified and fed as a higher level signal via the same wire to the imaging or measurement instrument. As the receive signal level is raised on the cable, the system is less sensitive to cable losses and external electromagnetic interference, hence maximizing the sensitivity of the imaging or the measurement.

For dynamic receive focusing with an array, the invention provides in its most general form an integrated electronic circuit to be mounted close to the transducer array, the circuit providing preamplifiers for the individual elements and delay circuits that are automatically switched in a time sequence after the pulse transmission, so that a dynamic focusing of the receive beam is obtained. In one embodiment of the invention, an acoustic delay line in front of the transducer element is used for the full or partial delay of the element signal. The circuit can also be set up so that the transmit pulses select different transmit foci in a sequence so that multiple transmit focus imaging can be obtained. The invention also opens for the use of coded signaling prior to the transmit pulse to select the transmit focus setting as well as the dynamic receive focusing range via a single wire.

In a simpler implementation, the invention achieves steered focus and aperture with a two wire cable between the imaging instrument and the transducer system by using a pre-programmed amplifier and switching circuit. The switching circuit selectively combines a set of pre-focused array elements with preset delays, for each focal range. The preset focus and delay for each element is selected so that the phase error both across each element and across the active aperture, is less than a limit, say 90–120 deg, for the range the element participates to the beam forming. Combining an increasing number of elements with depth, one obtains an increasing aperture that limits the beam diameter with the increasing depth.

In a particularly simple implementation, both the pre focusing and delay of each element are provided with acoustic lens material with adapted curvature and thickness in front of each element. The electronic circuit then provides possible amplification of the signal from each element before the signals are selectively added in a time steered switching circuit that is reset by the pulse transmission.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1A:
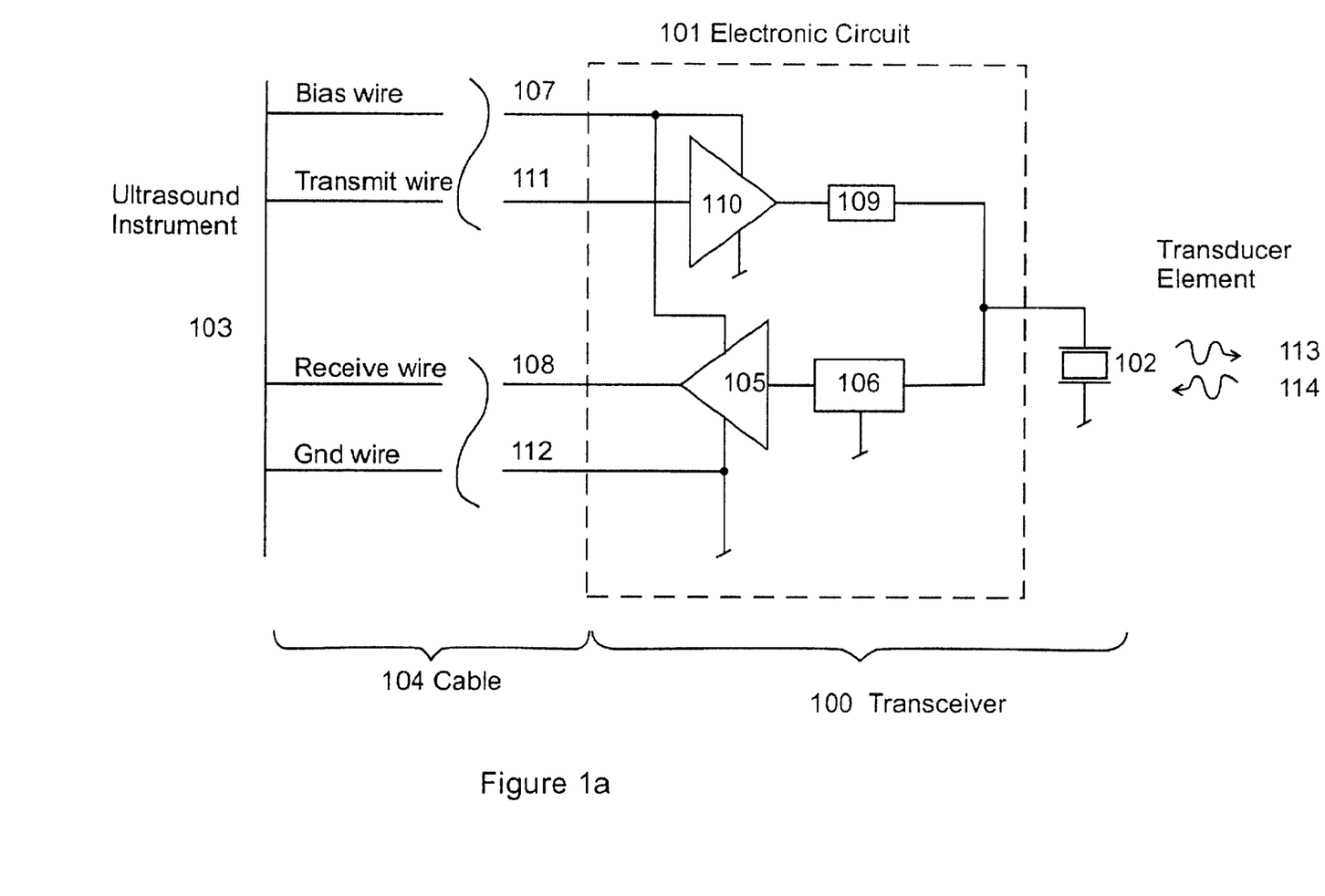
FIG. 1a shows an example embodiment according to the invention of a transceiver composed of a single transducer element and an electronic circuit that is operable from an ultrasound measurement or imaging instrument via a multi wire cable.

Several examples of embodiments of the invention are presented in the following, with reference to the Figures. FIG. 1a shows an ultrasound pulse echo transceiver unit 100, composed of an electronic circuit 101 and an ultrasound transducer 102. The transceiver unit is coupled to an ultrasound measurement or imaging instrument 103 via a multi wire cable 104. The DC-bias voltage to the electronic circuit is fed from the ultrasound instrument via a bias wire 107, and the transceiver has a common ground connected to the ultrasound instrument via a gnd wire 112. It is clear also that according to common techniques of shielding of low level receive signals from external electromagnetic interference, the whole cable can be enclosed in a conducting metal shield that is grounded at the instrument.

The hot electrode of the transducer element is coupled to the one terminal of a transmit switch 109, where the other terminal is coupled to the output of a transmit pulse buffer 110. High voltage AC transmit pulses are fed via a transmit wire 111 from the ultrasound instrument, where for the duration of the transmit pulse, the transmit switch 109 is switched on to a low AC value for transmission of an ultrasound pulse 113 from the transducer element 102.

After the pulse transmission, the transmit switch 109 switches to a high AC-impedance, isolating the transducer element 102 from the transmit drive circuit 110. The backscattered ultrasound wave 114 is converted to a low level electric signal by the transducer, and fed to the preamplifier 105, via the receiver input switch 106. This receiver input switch has a fairly low series impedance for low level signals in the receive period, and its series impedance is designed into the preamplifier characteristics. With the high voltage AC transmit pulse at the transducer, the receiver switch 106 functions as a limiter of the maximal current into the amplifier input, hence providing protection of the receiver amplifier input for the high AC voltage transmit pulses.

The output of the receiver amplifier is fed to the ultrasound instrument via a receive wire 108, hence providing an amplified version of the backscattered signal on the transducer element to the ultrasound measurement or imaging instrument. The amplified level of the received signal on the cable connecting to the ultrasound instrument, reduces the effect of cable transmit losses and interference from external electromagnetic sources, hence providing a high signal to noise ratio of the received signal transferred to the instrument.

Figure 1B:
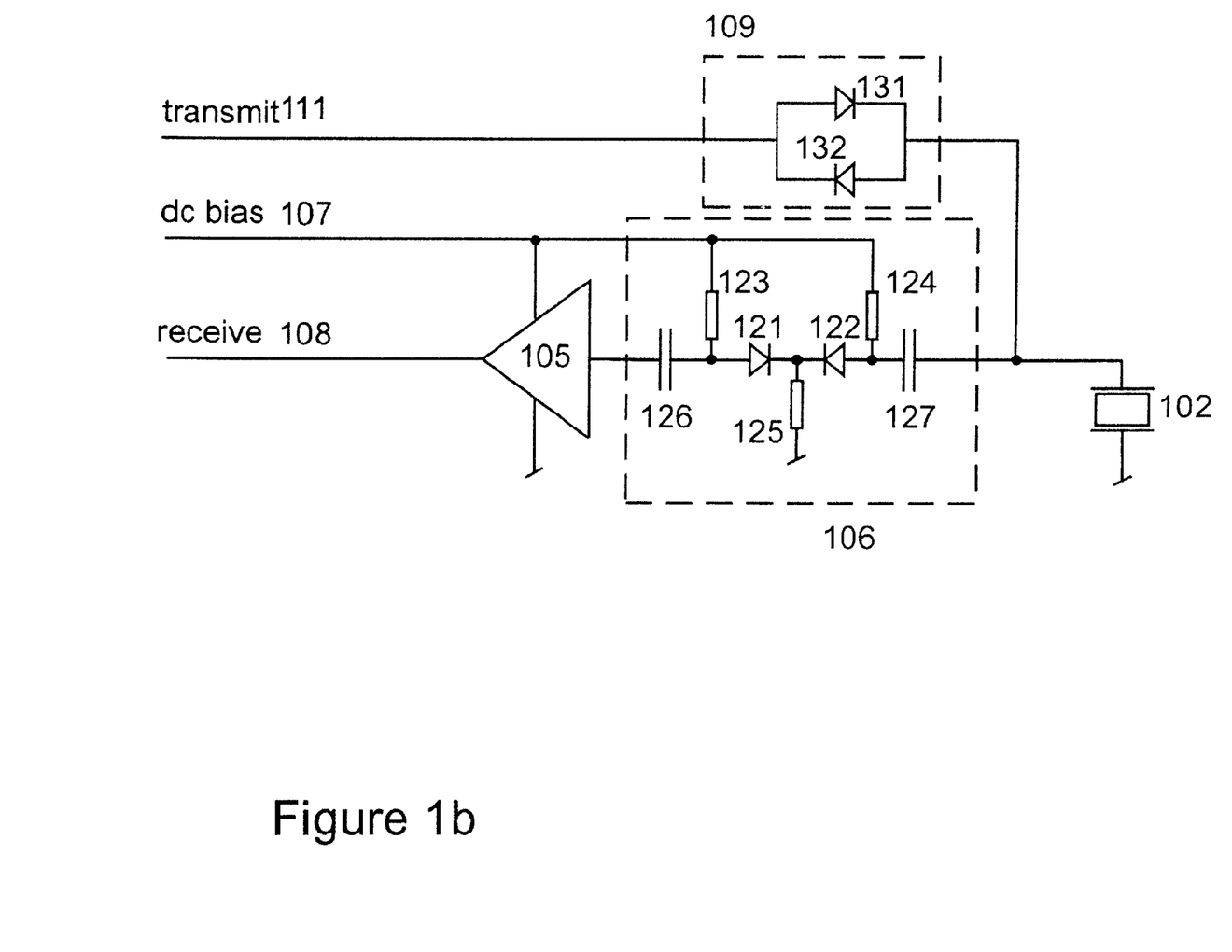
FIG. 1b shows example embodiments of a receiver input switch and a transmit switch that are part of the electronic circuit, according to the invention.

An example of a receive transmit switch is shown as 106 in FIG. 1b. This switch is composed of two diodes 121 and 122 coupled back to back with a forward bias current arranged through the biasing resistors 123, 124, 125. Capacitors 126 and 127 provides DC-bias isolation of the switch to the preamplifier input and the transmit circuit, where 109 shows an example of a transmit switch composed of two diodes 131 and 132. The transmit switch provides high AC-impedance isolation for low level AC voltages on the switch input and low AC-impedance for high level AC voltage swing at the transmit switch input.

Figure 1C:
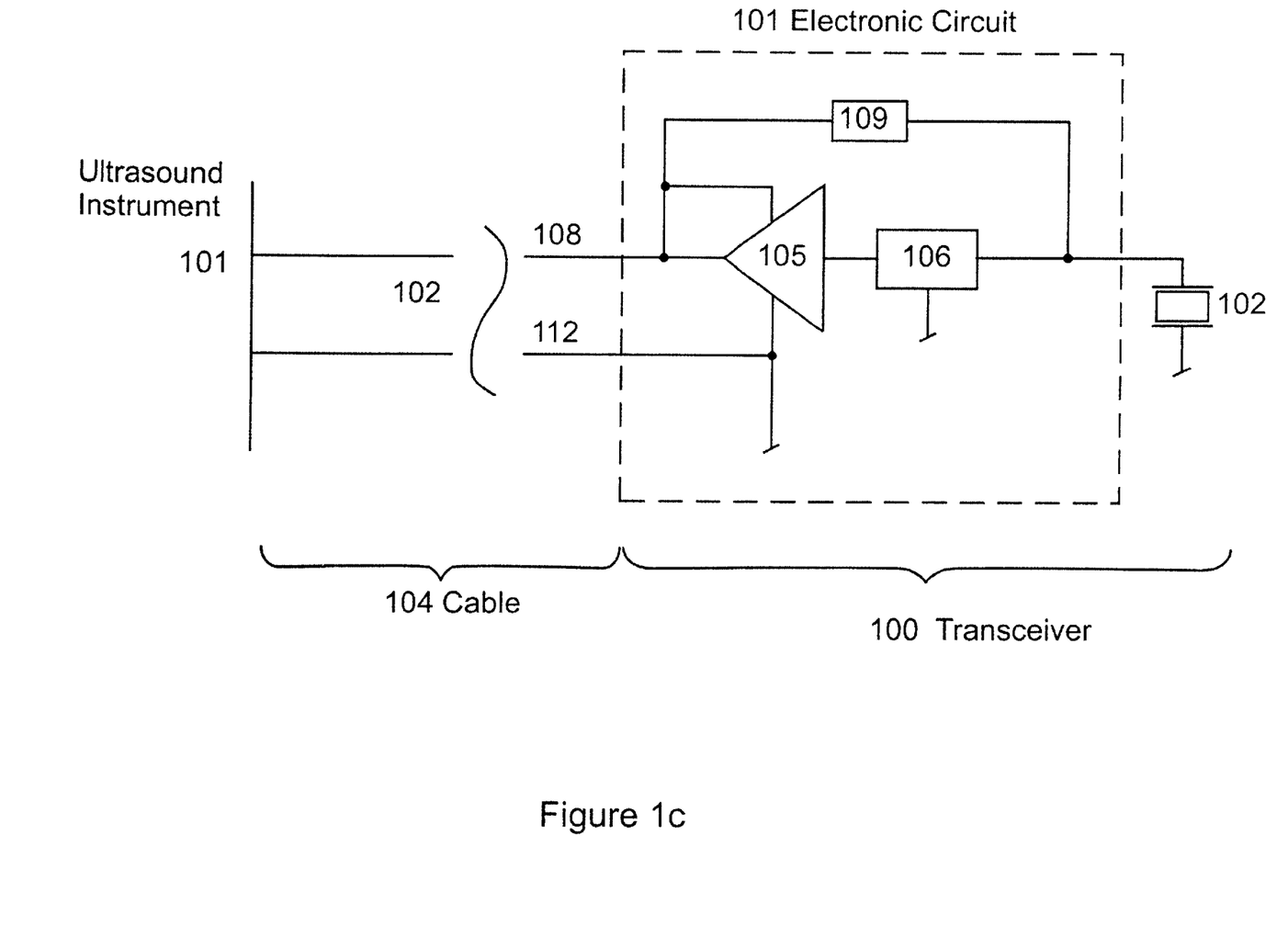
FIG. 1c shows a simplified embodiment according to the invention of a transceiver composed of a single transducer element and an electronic circuit that is operable from an ultrasound measurement or imaging instrument via a two-wire cable.

A simplified transceiver system that can be fed from the ultrasound instrument via a two-wire cable, is illustrated in FIG. 1c. In this embodiment of the invention, the DC-bias, the transmit, and the receive wires are merged to a single signal wire 108, which including the ground wire 112 provides a two-wire operation of the transceiver system from the ultrasound instrument.

In the example embodiment of FIG. 1c, the transmit buffer on board the electronic circuit is missing, where the transducer transmit drive signal is fed directly form the ultrasound instrument via the common signal wire 108 to the transmit switch 109 and further to the transducer element 102. With for example an open transistor output of the pre amplifier 105, or with a resistor in series with the amplifier output, one can feed the DC-bias via the common wire 108 to the amplifier output without damage of the amplifier. Even with an open transistor output, it is still convenient to use a series resistor of the amplifier output for impedance matching of the receive signal to the instrument cable. Such a series resistor will further provide improved protection of the amplifier output during the high AC voltage transmit pulse.

The example receive isolation switch 106 and transmit switch 109 in FIG. 1b automatically switches between the high impedance in isolation mode and low impedance in on mode, by the signal levels at the switch inputs. It is clear that according to general methods of electronic circuit design, these switches can be composed of switching transistors or diodes where the switch impedances are determined by a control signal voltage or current. The invention hence includes such modifications of the switch examples in the presented Figures according to the standard electronic design techniques.

Figure 1D:
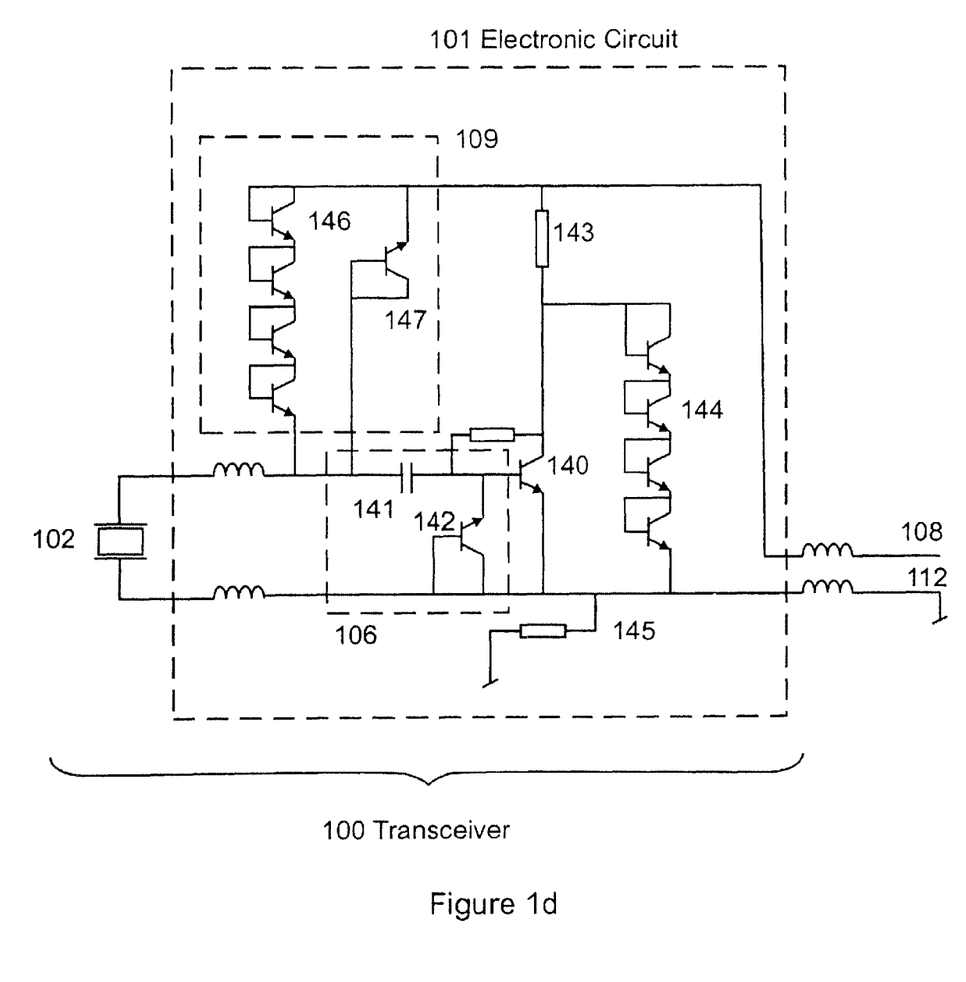
FIG. 1d shows a component level example embodiment according to the invention of a transceiver circuit with a single transducer element operable from the ultrasound instrument via a two-wire cable

FIG. 1d shows a detailed circuit example of an implementation according to the embodiment in FIG. 1c. In this Figure, the transistor 140 provides the preamplifier where the input protection switch 106 is provided by a series capacitor 141 and a limiting transistor diode 142. The capacitor 141 is designed together with the amplifier input resistance to provide high level transfer function in the actual ultrasound frequency range, at the same time as limiting the load by the transistor diode 142 during the transmit period. An advantage of a series capacitor for receiver input protection compared to diodes and transistors, is that a capacitor adds very little noise to the received signal.

The open output of amplifier transistor 140 is fed to the signal wire 108 via a resistor 143 which provides impedance matching to the receiver cable in the receive interval, and together with the transistor diodes 144 provides high voltage transmit pulse protection of the amplifier transistor. A resistor 145 to the substrate allows the use of negative transmit pulses in this design.

The transmit switch 109 is in this example composed of a set of diode transistors 146 and 147 with opposite direction. The four transistor diodes 146 are in series to allow for a DC bias voltage between the combined bias/transmit/receive wire, and the transducer. The AC voltage amplitude of the transmit circuit is assumed to be much higher than the cumulative knee voltage of the diodes.

Figure 2A:
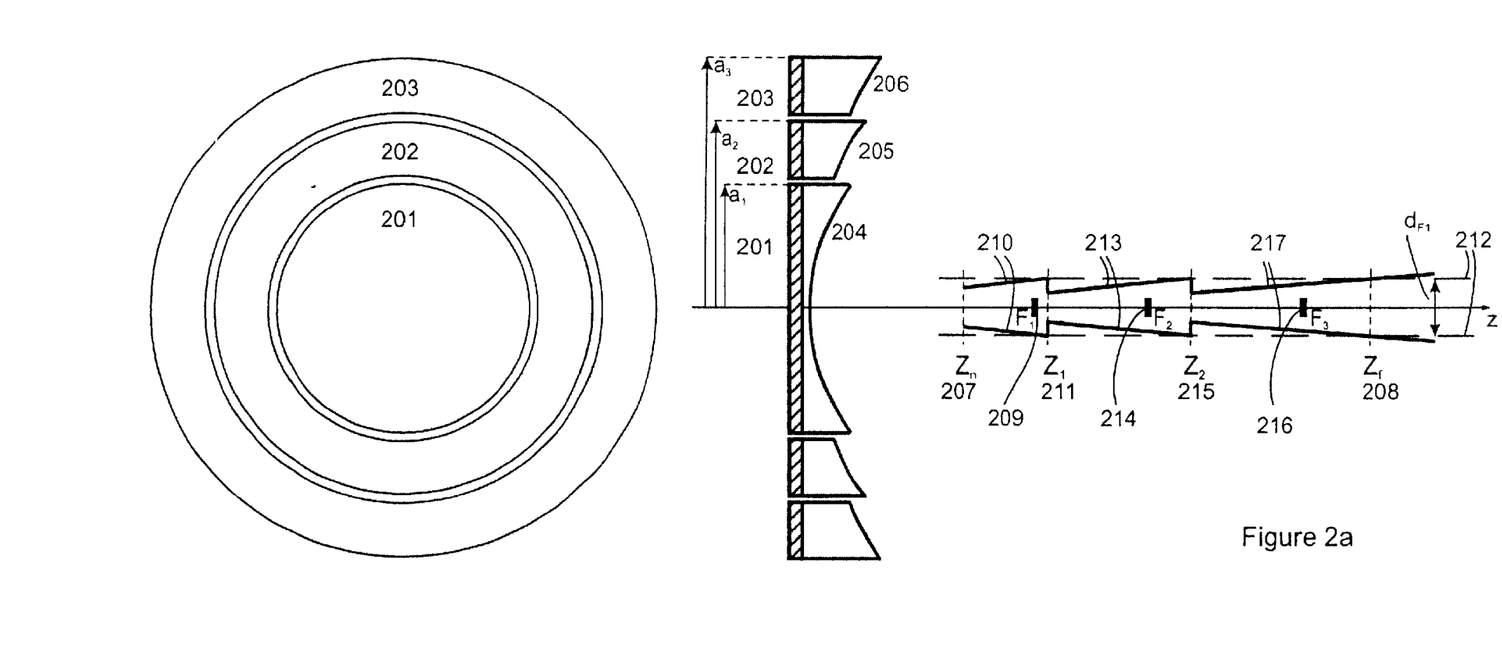
FIG. 2a shows an example embodiment of an annular array according to the invention for switched steering of the active aperture and focus depth.

For steered focusing of the ultrasound beam, the invention provides a solution of combining the signal from a selectable group of transducer elements, where the signal/wave for each element has a fixed focus and delay. An example annular array that operates according to the principles of the invention, is shown in FIG. 2a. This Figure shows a plane annular array with 3 elements 201, 202, and 203. In this first example, the element focusing and delay lines are implemented by acoustic materials 204, 205, and 206 inserted in front of the transducer elements in the acoustic path between the tissue and the transducer elements. In this particular example is shown an acoustic material with propagation velocity higher than that of the object to be imaged (~1540 $\mu m/\mu sec$ for an object of soft tissue), which provides in essence a signal advancement more than a delay. However, such a signal advancement can be considered as a negative delay, and for simplicity we shall refer to such an arrangement of acoustic material in front of the transducer as an acoustic delay line, regardless whether the wave velocity of the material is higher or lower than that of the object/tissue.

Curving of the acoustic material provides a fixed focusing of the wave from the element, and the middle thickness of the material provides a delay or advancement (negative delay) of the element signal/wave. As a general rule, the focus and delay of the signal/wave for each element is selected so that the phase error of the wave from a point source to all points in the active aperture is less than a limit, $\phi_m$.

In the particular example of FIG. 2a, the center element 201 participates in the beam forming in the range $R_1$ from $z_n$ to $z_f$ shown as 207 and 208 in FIG. 2. To minimize the phase error across the element over the whole range it participates to the image, we select the fixed focus $F_1$ of the element as $$F_1 = \frac{2z_f z_n}{z_f + z_n} \quad (1)$$

indicated as 209 in the Figure. For minimal phase error in the whole range, the error across the central element is then $\phi_m$ at the outer ranges of $z=z_n$ and $z=z_f$, which gives a radius of the inner element as $$a_1 = \sqrt{2\lambda z_f \frac{z_n}{z_f - z_n} \frac{\phi_m}{\pi/2}} \quad (2)$$

The beam diameter from this central element is in its imaging range given as $$d_{zl} = \frac{\lambda}{a_1} z \quad (3)$$

The beam is limited by the expanding lines 210, and at a certain depth $z_1 = d_{F1} a_1/\lambda$, indicated as 211, the beam diameter from the element 201 expands past a limit diameter $d_{F1}$, indicated as the lines 212 in FIG. 2a. Beyond the point $z_1$ we reduce the beam width by combining the signal from element 201 with the signal from a $2^{nd}$ element 202. This reduces the beam width below $d_{F1}$ to that given by the example lines 213.

In this example embodiment, the $2^{nd}$ element participates to the beam forming in the range $R_2$ from $z_1$ to $z_f$. The fixed focus of the $2^{nd}$ element is selected so that the phase error across the element is minimal in $R_2$, which implies that the phase error is equal to $\phi_m$ at $z=z_1$ and $z=z_f$, which gives $$F_2 = \frac{2z_f z_1}{z_f + z_1} \quad (4)$$

indicated as 214 in FIG. 2a. This focal selection minimizes the phase error across the whole range from $z_1$ to $z_f$ the element participates to the beam. The outer radius of the $2^{nd}$ element is selected so that the maximal phase error across the element is $\phi_m$ for $z=z_1$ and $z=z_f$. This implies that $$a_2 = \sqrt{a_1^2 + 2\lambda z_f \frac{z_1}{z_f - z_1} \frac{\phi_m}{\pi/2}} \quad (5)$$

The focus of the elements are determined by the curvature of the lens/delay line material. For large F-numbers (=F/D where D is the aperture diameter) one can approximate the lens curvature radius $R_k$ for element #k with focus at $F_k$, as $$R_k = \left(1 - \frac{c_t}{c_l}\right) F_k \quad (6)$$

where $c_l$ is the propagation velocity of the lens material and $c_t$ is the propagation velocity of the object material, for example the tissue. With F-numbers approaching unity, the lens curvature must vary across the lens, where the details can be calculated from geometric ray-acoustics.

For optimal focusing of the new composite beam, one can adjust the thickness of the lens/delay line material in front of the transducer element so that the propagation phases of the waves from both elements are equal in the focus $F_2$. This propagation phase is given by the average propagation time from all points of the element to the field point. The propagation time from all points on element no 2 to $F_2$ is the equal, because this gives the focus at $F_2$. The average thickness of the lens material in front of element no 2, which gives the signal/wave delay for this element, must hence be chosen so that the propagation time for element no 2 to $F_2$ is equal to the average propagation time from element no 1 to $F_2$. This variation in lens/delay line material thickness is front of each element is indicated in FIG. 2a, and the details of the lens/delay line material thickness and curvature can be calculated from geometric ray-acoustics.

The procedure is then carried through according to the general principle where we assume that the signals from k transducer elements are combined to form an active aperture. As z increases so that the focal diameter expands past the limit $d_{F1}$ at $z_k$, we add element k+1 to the active aperture. The fixed focus of element k+1 and its radius are chosen so that the phase error takes the value $\phi_m$ for $z=z_k$ and $z=z_f$. This gives $$F_{k+1} = \frac{2z_f z_k}{z_f + z_k} \quad (7)$$

$$a_{k+1} = \sqrt{a_k^2 + 2\lambda z_f \frac{z_k}{z_f - z_k} \frac{\phi_m}{\pi/2}}$$

The procedure is then repeated as long as $z_k < z_f$.

In particular for the 3-element array of FIG. 2a, we include the $3^{rd}$ element 203 at $z_2$, indicated as 215 in the Figure, and the Focus of the $3^{rd}$ element is selected at $F_3$ according to Eq.(6) and indicated as 216 in the Figure. The thickness and curvature of the lens/delay line material 206 in front of element no 3 is then calculated according to geometric ray-acoustics so that: 1) the propagation time from element no 3 to $F_3$ is constant across the element to obtain the focus at $F_3$, and 2) the propagation time from element no 3 to $F_3$ is equal to the average propagation time for all points on element no 1 and no 2 to $F_3$, to give the same propagation phase at $F_3$ for the combined element no 1 and 2 wave and the element no 3 wave. The beam width from the full active aperture expands as the lines 217 past the depth $Z_2$.

The total number of required array elements is determined by the maximal phase error $\phi_m$, and the selected image range from $z_n$ to $z_f$, combined with the selected limit beam width $d_{F1}$. With these parameters given, both the focus and the diameter of the first element is given, and hence also the beam diameter in the nearest region where only the first element participates to the focus. One then must select both $z_n$ and $d_{F1}$ in pair so that the nearest beam diameter is less than $d_{F1}$. Often one has a situation where we want to limit the deepest beam diameter at $z_f$ to $d_{F1}$. This gives a maximal aperture radius of the whole array of $a_K = \lambda z_f/d_{F1}$. With an acceptable phase error $\phi_m$ across each element, one then must choose $z_n$ as $$z_n > \frac{z_f}{2} - \sqrt{\frac{z_f^2}{4} - \frac{d_{F1}^2 z_f}{\lambda} \frac{\phi_m}{\pi}} \quad (8)$$

One hence can use a variety of design schemes using the general principles outlined above. One should also note that in the active aperture for the deep ranges one could exclude the inner elements. This will raise the sidelobes in the resulting beam, depending on the relative diameter of the excluded elements to the diameter of the total active aperture. The gain is that the outer range where the inner elements participates in the active aperture is reduced, allowing for closer $z_n$ with the inner element, or wider diameter of the inner elements with narrower beam at the inner ranges.

Figure 2B:
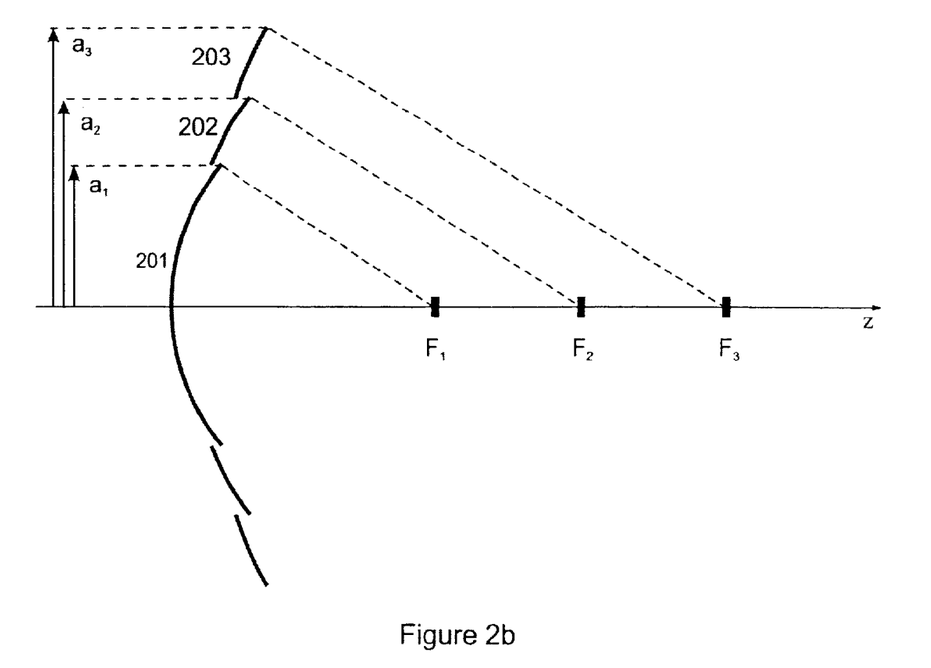
FIGS. 2b and 2c show yet two other example embodiments of annular arrays according to the invention for switched steering of the active aperture and focus depth.
Figure 2C:
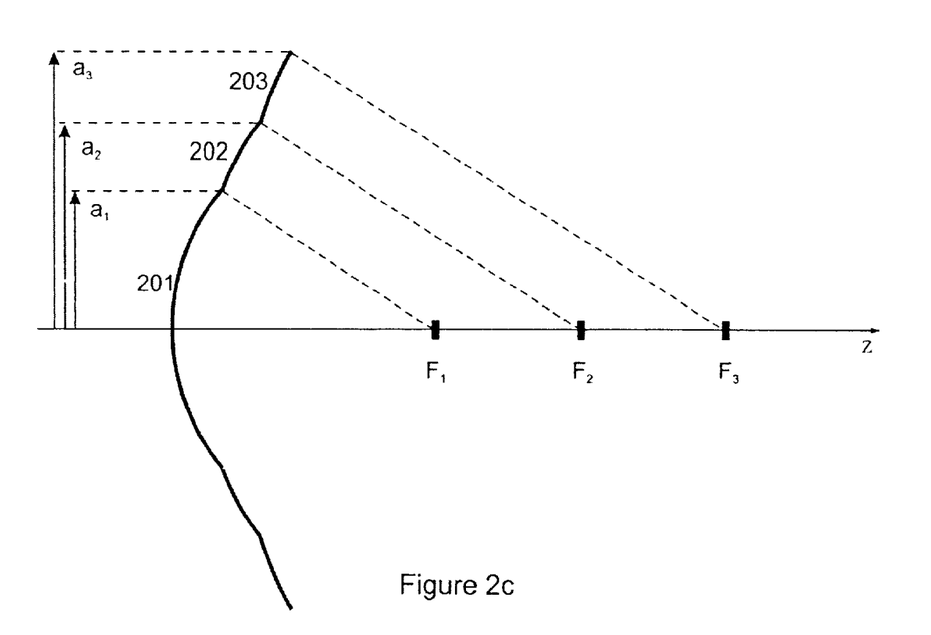

The focusing and delay of the signal/wave from each element can be obtained without a lens/delay material by forming the array surface as indicated in FIG. 2b. In this Figure, the focus of each element is determined by its curvature, while the propagation delay for each element is determined by the location of the element. In FIG. 2b it is indicated element locations that gives the same propagation time from a new element to its focus, as the average propagation time from the inner elements to the new element focus, as discussed above. This gives a complex form of the array surface, where FIG. 2c gives a shape of the array surface that is simpler to make. One can in this last situation use some added electronic delays in the electronic circuit to be described below, to ensure that the phase in the focus of a new element is the same for the signal/wave from the new element and the inner elements. The solution in FIG. 2a then provides simpler manufacturing as the lens/delay material can be cast or cut into its final shape on the top of a plane array. The average thickness of the lens/delay material in FIG. 2a also increases with the element width, and absorption in the lens/delay material then provides a convenient apodization of the signal/wave across the array, for reduction of the beam sidelobes.

Figure 3A:
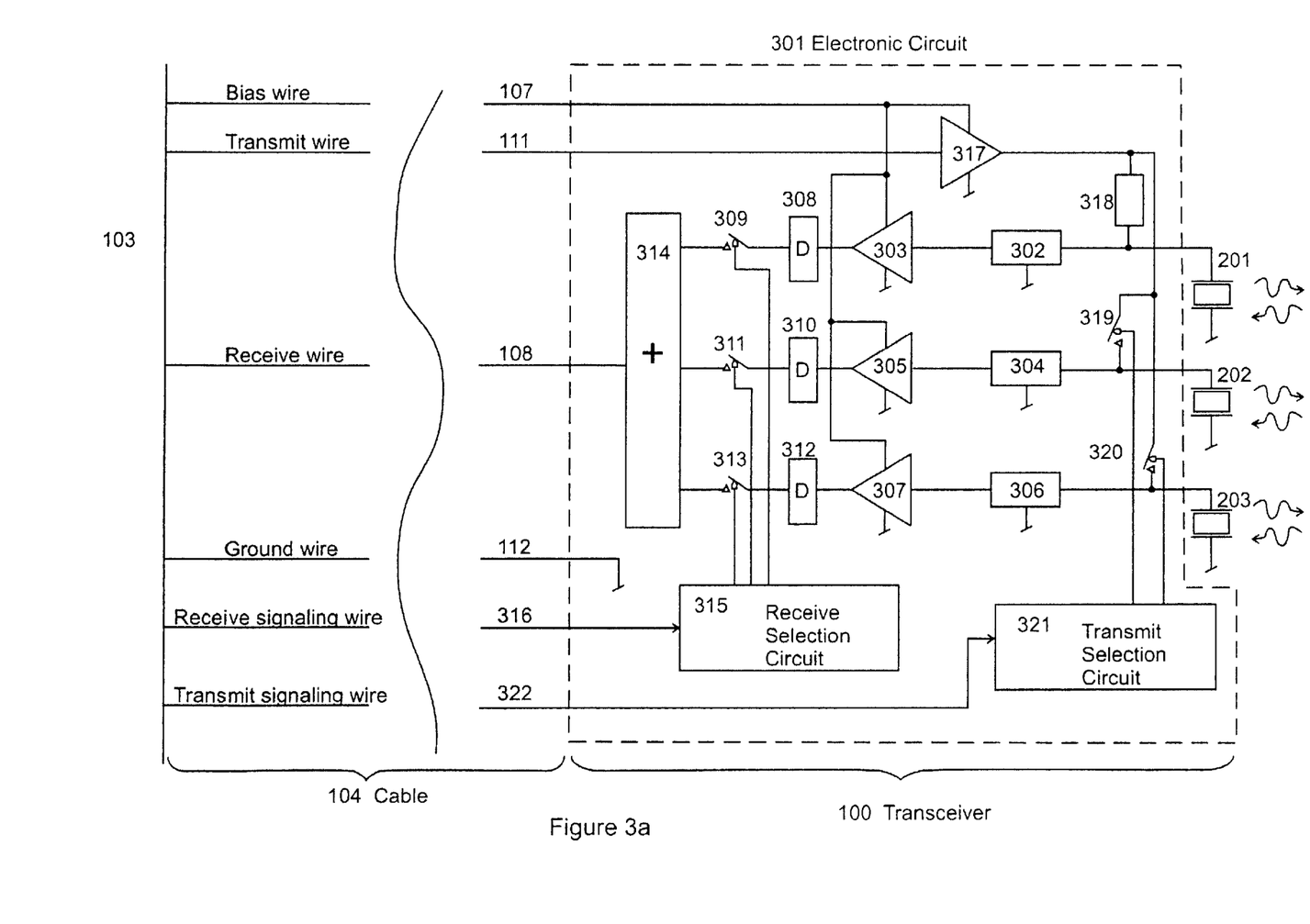
FIG. 3a shows an example embodiment of a transceiver circuit according to the invention composed of an electronic circuit and a transducer array for selectable switching of the active receive and transmit apertures and focus depths, the transceiver being operable at a distance from an ultrasound measurement or imaging instrument via a multi-wire cable.

An example pulse echo transceiver circuit with selectable transmit and receive focusing according to the invention, is shown as 300 in FIG. 3a. The transceiver is composed of an example electronic circuit 301 with amplifiers and switches coupled to three transducer array elements 201, 202, and 203. In receive mode, the hot electrode of the transducer elements are coupled to receiver amplifiers 303, 305, and 307, through the receiver input switches 302, 304, 306 which functions as receiver protection during transmit similar to that discussed for the transceivers in FIGS. 1a–d. The outputs of the receiver amplifiers are fed through focus selection switches 309, 311, 313, to a signal summing circuit, possibly through electronic signal delay lines 308, 310, 312. The output of the receive summing circuit is the selectively focused receive signal, that is fed via the receive wire 108 to the ultrasound instrument.

The receive focusing switches are in this example embodiment of the invention, controlled by a Receive Selection Circuit 315, that is further controlled by signaling from the ultrasound instrument through at least one receive signaling wire 316. Through signaling on this wire, a selected group of the receive focusing switches 309, 311, and 313 are closed to sum the receive signals from a selected group of the transducer array elements 201, 202, 203. With reference to the discussion in relation to FIG. 2, we see that this selection provides a selected active receive aperture and beam focus. The delay lines 308, 311, 312 are selected in combination with acoustic delay lines in front of the transducer elements according to the description in relation to FIG. 2, to provide total element signal/wave delays requested for best focusing of the receive beam. In many embodiments of the invention, all the signal delays are obtained by forming the array surface with possible added acoustic material delay lines in front of the array, so that the electronic delay lines 308, 310, 312 can be omitted. Hence, with the presented embodiment one can select the receive focus and aperture through signaling on the receive signaling wire 316.

For transmission of an ultrasound pulse, the embodiment in FIG. 3a provides a transmit pulse from the ultrasound instrument to the transceiver via a transmit cable 111. The signal is fed to a transmit buffer amplifier 317 that connects to the transducer elements 201, 202, 203, through the transmit switches 318, 319, 320. In this particular embodiment the transmit switch 318 is selected as the diode switch of 109 of FIG. 1b, that automatically turns to a low AC impedance with a high AC voltage pulse at the input, and to a high AC impedance with a low level AC signal at the input. Hence, in this embodiment element 201 always participates in the active transmit aperture.

The other array elements 202 and 203 can be connected to the transmit buffer 307 through switches 319 and 320 that are actively switched on or off by control signals that are provided by the Transmit Selection Circuit 321, that are operated from the ultrasound instrument via at least one Transmit signaling wire 322. Through signaling from the ultrasound instrument this embodiment hence allows free selection of a group of elements to participate in the active transmit aperture to provide a selectable transmit beam focus.

Through combined signaling on the receive, 316, and transmit, 322, signaling wires one can hence obtain a minimal width of the combined transmit/receive observation beam within a depth range. For consecutive transmit pulses, this depth range can be sequentially increased over the full measurement/imaging range from $z_n$ to $z_f$, for imaging of the entire range with a narrow width of the composite transmit/ receive observation beam.

To reduce the number of wires connecting to the ultrasound instrument both the receive and transmit signaling can be obtained via the transmit wire 111, using the high AC voltage transmit pulse itself. As an example, both the receive and transmit selection circuits can be reset by a high voltage on the transmit wire over a period of time, so that for the first transmit pulse after the reset, a short focus depth of the combined transmit/receive observation beam is obtained. The Receive and Transmit Selection Circuits 315 and 321 are then incremented for each consecutive transmit pulse so that increasing focus depth of the observation beam is obtained for each transmit pulse, for measurement and imaging in ranges of increasing depth for each transmit pulse. This embodiment hence provides minimal beam width over the whole measurement/imaging range from $z_n$ to $z_f$.

One also note that with this type of operation, the receive focusing switch 309 can be hardwired closed, allowing for a merger of the Receive (315) and Transmit (321) Selection Ciruits. However, to minimize the number of transmit pulses, especially with larger amounts of array elements, one typically would select coarser depth ranges for the transmit focusing, with dynamic switching of the receive focus in each transmit focus range. The Transmit Selection Circuit 321 would then typically select coarser groups of elements for the transmit aperture, while the Receive Selection Circuit could typically be reset by each transmit pulse and provide a domino time switching of the receive focusing switches to provide a steadily increasing aperture and focus depth with time after the pulse transmission, referred to as dynamic receive focusing. With this method one could cover the whole imaging range with fewer transmit pulses down to a single transmit pulse with a fixed transmit aperture and focus. This provides the highest rate of full measurement/ imaging, albeit with some less width of the composite transmit/receive observation beam than with multiple transmit focus measurements and imaging.

Figure 3B:
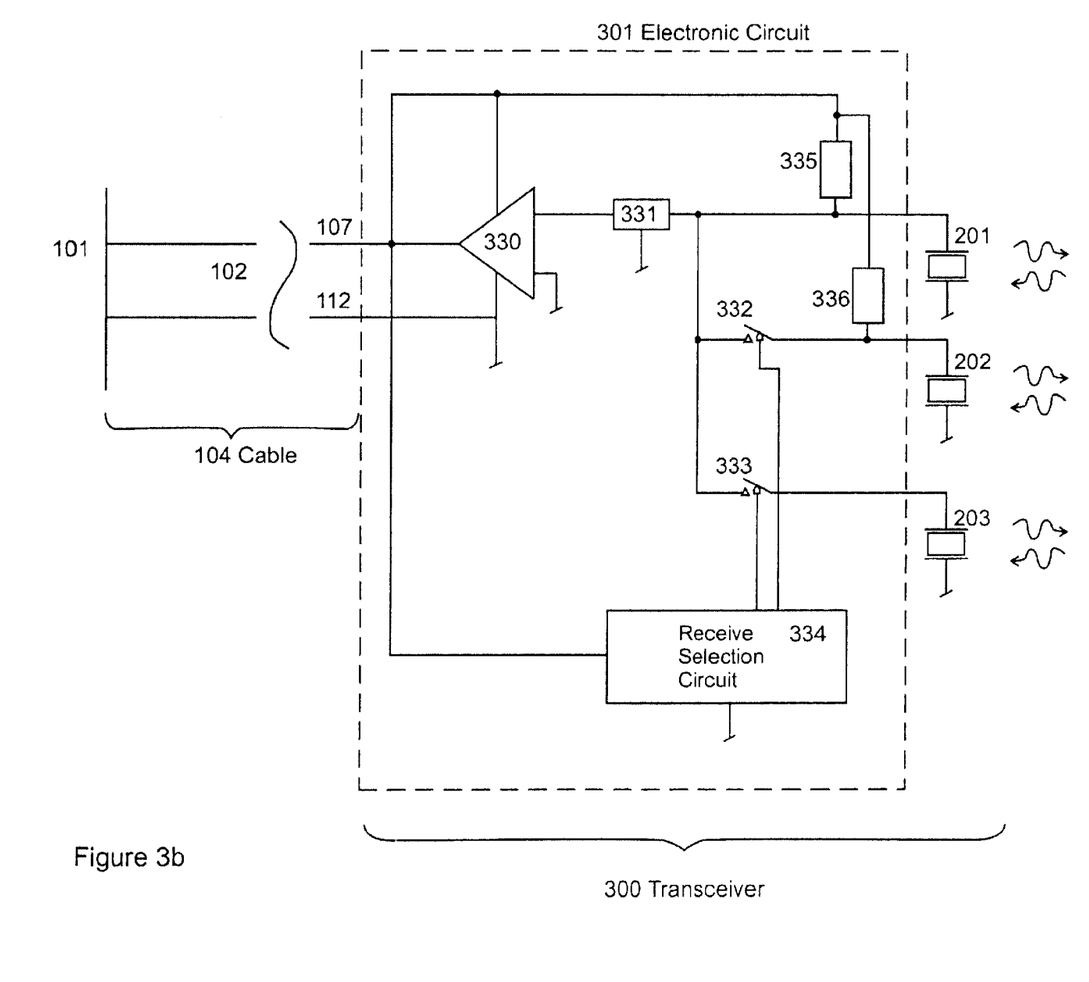
FIG. 3b shows an example embodiment of a simplified transceiver circuit according to the invention composed of an electronic circuit and a transducer array for dynamic switching of the active receive aperture and focus depths with a fixed active transmit aperture and focus depth, the transceiver being operable at a distance from an ultrasound measurement or imaging instrument via a two-wire cable.

A simpler embodiment according to the invention that is operated from the ultrasound instrument via a two-wire cable, is shown in FIG. 3b. In receive mode, the transducer elements are selectively connected to the summing amplifier 330 through a receive input switch 331 that functions as protection of the receive amplifier during transmit. In this embodiment, element 201 is firmly connected to the summing amplifier, while elements 202 and 203 are connected to the summing amplifier through controllable receive focusing switches 332 and 333, that are controlled by the Receive Selection Circuit 334. This circuit is reset by the transmit pulse, and up to time $t_1=2z_1/c$ after the pulse transmission, only the element 201 is connected to the summing amplifier. At this time, the receive focusing switch 332 is switched on to increase the active receive aperture and focus depth according to the principles described in relation to FIG. 2. At the time $t_2=2z_2/c$ after the pulse transmission the receive focusing switch 333 is also switched on with further increase of the active receive aperture and focus depth, so that effectively a dynamic receive beam focus is obtained. The dynamically focused receive signal at the output of the summing circuit is transferred to the ultrasound instrument over the common bias/receive/transmit wire 107.

For ultrasound pulse transmission, the array elements 201 and 202 are connected to the common bias/receive/transmit wire 107 via transmit switches 335 and 336 which are automatically switched on to a low AC impedance by the high AC voltage at the transmit wire, and off to a high AC impedance at a low level AC voltage at the transmit wire. With the given embodiment, the two array elements 201 and 202 are hence coupled in parallel in the transmit mode, providing a long range of the transmit focus with moderate transmit aperture and width, according to the principles described in relation to FIG. 2 above.

The embodiment in FIG. 3b hence provides a transceiver with fixed transmit focus and dynamically switched receive focus, for moderately narrow combined transmit/receive observation beam over the whole measurement/imaging range, with a single transmit pulse for the whole range, and hence a high frame rate of the image than with multiple transmit focusing described in relation to FIG. 3a.

With the focusing technique described in relation to FIG. 2, the area of the array elements will increase with the focus depth. In transmit mode, one should then drive all active elements with the same voltage, and the physics of wave propagation in the tissue provides adequate modification of the element waves depending on the element area.

In receive mode, a point source on the beam axis will give an open circuit voltage from each element that is independent of the element area within limits where variation of the element area does not inflict on the vibration pattern of the element. The electric impedance of the elements then varies as the inverse of the element area.

With high input impedance voltage receive amplifiers in the electronic circuits that amplifies the open circuit voltage of the transducer elements, one must use an amplification of each element receiver channel proportional to the transducer area, for proper beam forming in the summing circuit. With low input impedance current receiver amplifiers, the input current from each transducer element will be inversely proportional to element electric input/source impedance, and hence proportional to the element area as described above. On then will get the right amplification of each element signal for appropriate beam forming with equal current gain of all the element receive channels.

Apodization of the element signals across the aperture is used to reduce the sidelobes in the beam. However, with large elements, as for example found with annular arrays, variations of electronic receiver gain between element channels has limited usefulness, as it introduces large steps in the apodization function between the elements which increases the side lobes. With large elements it is therefore very useful to provide a more continuous apodization with an absorbing acoustic material in front of the array, with varying thickness, as for example illustrated in FIG. 2a.

The example in FIG. 2 describes switched focusing with annular arrays, where it is clear from the discussion that the basic principle of the invention can be used with linear and two-dimensional arrays. Beam scanning with linear arrays can be obtained through lateral switching of the participating elements according to well known principles, while beam scanning annular array by mechanically rotating or translating the whole transceiver assembly.

The transceiver is hence well adapted to be mounted at the tip of an elongated imaging device for insertion into an imaging object, for example a living body, to place the transceiver close to structures to be imaged. This can allow the use of high ultrasound frequency to image the structures at the highest possible resolution. Typical examples of such applications are imaging at minimal invasive surgery, intravascular imaging of a vessel wall, intrauterine imaging of the uterus wall, or intraurethra imaging of the prostate. In some applications one can use an elongated device with a tip that is steerable from the proximal end of the device for placement of the imaging tip on the structure to be imaged, In other applications the elongated device is free floating, for example to be inserted into a blood vessel.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An ultrasound pulse echo transceiver system to operate at a distance from an ultrasound measurement or imaging system through a minimal set of wires comprising, the transceiver system being composed of at least one ultrasound transducer element and an electronic circuit being mounted close to the transducer element and containing at least a receiver amplifier and a transmit switch, the DC bias voltage to the electronic circuit being provided from the ultrasound instrument via a bias wire, the transducer element being electrically connected to the input of the receiver amplifier, the amplifier input being designed so that that it tolerates large AC transmit pulse voltages at the transducer electrodes, the output of the receiver amplifier being fed to the ultrasound instrument through a receiver wire, possibly through other electronic circuits, the transmit switch being on one terminal connected to the hot electrode of the transducer element and on the other terminal connected to a transmit wire that feeds high voltage AC pulses from the ultrasound instrument, possibly through a buffer amplifier that is part of the transceiver, for transmission of ultrasound pulses from the transducer.

2. An ultrasound pulse echo transceiver system according to claim 1, where at least two of the receive, bias, and transmit wires are connected and merged to a single wire to reduce the number of wires connecting the transceiver to the ultrasound instrument.

3. An ultrasound transceiver system according to claim 2, where the receive, bias, and transmit wires are connected and merged to a single wire, so that the transceiver is operable from the ultrasound instrument through a two wire cable including ground connection to the transceiver system.

4. An ultrasound pulse echo transceiver system according to claim 1, where the transmit switch is composed of at least one diode that automatically switches to a low series AC impedance with a high AC voltage transmit pulse at the transmit wire, and automatically switches to a high AC impedance with the level of the AC signal at the transmit wire being below a defined level.

5. An ultrasound pulse echo transceiver system according to claim 1, where the transmit switch is composed of switching transistors or diodes where the switching is controlled by a control signal, where the switch control signal is selected so that the switch is on during the transmit period, and is off during the receive period.

6. An ultrasound pulse echo transceiver system according to claim 5, where the transmit switch control signal is derived from the high voltage AC transmit pulse on the transmit wire, so that the switch is automatically set on by the transmit pulse and automatically set off in the receive period.

7. An ultrasound pulse echo transceiver system according to claim 1, where the ability of the receiver amplifier to withstand high AC transmit voltages at the transducer electrode, is obtained by a circuit with an impedance in series with the amplifier input.

8. An ultrasound pulse echo transceiver system according to claim 7, where the series circuit is a capacitor.

9. An ultrasound pulse echo transceiver system according to claim 7, where the series circuit is two diodes connected back to back with a bias current so that for low level signals at the transducer, the AC impedance of the diodes is low, while for high level AC signals at the transducer, the AC impedance of the diodes is high.

10. An ultrasound pulse echo transceiver system according to claim 7, where the series circuit is a receiver switch composed of switching transistors or diodes where the switching is controlled by a control signal, where the switch control signal is selected so that the receiver switch is off during the transmit period and is on during the receive period.

11. An ultrasound transceiver system according to claim 10, where the receive switch control voltage is derived from the high voltage transmit pulse, so that the receive switch is automatically switched off by the transmit pulse, and automatically switched on in the receive period.

12. An ultrasound imaging device for imaging of structures through narrow channels, where an ultrasound transceiver system according to claim 1 is mounted at the tip of an elongated insertion device and connected to an ultrasound imaging system through a small number of wires.

13. An ultrasound imaging device according to claim 12, where the tip of the elongated insertion device is direction steerable from the external end of the insertion device.

14. An ultrasound imaging device according to claim 13 where the elongated insertion device is a device for insertion into a living body for imaging of tissue structures in the living body.

15. An ultrasound imaging device according to claim 12 where the elongated insertion device is a device for insertion into a living body for imaging of tissue structures in the living body.

16. An ultrasound transducer according to claim 15 where the elongated insertion device is a catheter for ultrasound imaging of the wall and surrounding tissue of a vessel or the urethra or other narrow channels in a body.

17. An ultrasound pulse echo array transceiver system to attain a selectable or dynamic focus in receive mode and to operate at a distance from an ultrasound measurement or imaging system through a minimal set of wires comprising, the transceiver system being composed of an ultrasound transducer array of elements where each element has fixed focus and is coupled to fixed signal delay lines, and an electronic circuit being mounted close to the transducer array and containing an electronic receive summing circuit and at least one electronic receive focusing switch, the DC-bias voltage to the electronic circuit being provided from the ultrasound instrument via a bias wire, the signal from possibly one array element being coupled firmly to the summing circuit, while the signal from at least some array elements being coupled via controllable electronic receive focusing switches to the summing circuit, possibly after amplification of each signal in preamplifiers and/or delay of each signal in electronic delay lines that are part of the electronic circuit, the signal from the summing circuit being a focused receive signal that is transmitted to the ultrasound instrument via a receive wire, the focus and signal delay for each element being determined so that by closing the focusing switches to the summing circuit for a selected group of elements, one obtains a selected active aperture and focus depth, and so that one by closing the focus switches in a sequence so that one increases the number of elements connected to the summing circuit, one obtains an increasing active receive aperture with an increasing focus depth.

18. An ultrasound pulse echo array transceiver system according to claim 17, where at least part of the element signal delay is obtained by an acoustic delay line that is part of the acoustic path in front of the element, the material of the acoustic delay line having wave propagation velocity different from that of the object to be measured or imaged, so that the thickness of the delay line material determines at least part of the element signal delay.

19. An ultrasound pulse echo array transceiver system according to claim 18, where the wave velocity of the acoustic delay line material is higher than that of the object to be imaged, and the acoustic delay line material has an absorption that produces a net apodization of the ultrasound signal across the active aperture for reduction of beam side lobes.

20. An ultrasound pulse echo array transceiver system according to claim 17, where the signal delay of each element is at least partially obtained by mechanically forming, for example curving, the total array surface.

21. An ultrasound pulse echo array transceiver system according to claim 17, where the electronic circuit contains at least one electronic transmit switch with one terminal connected to the hot electrode of at least one of the transducer elements, and the other terminal connected to a transmit wire that feeds a high voltage AC transmit pulse from the ultrasound instrument, possibly through an electronic delay line and/or a buffer amplifier that are part of the transceiver, the transmit switch circuit having the ability to switch between low electric series impedance in the transmit period and high electric impedance in the receive period.

22. An ultrasound pulse echo array transceiver system according to claim 21, where at least one electronic transmit switch has the ability that the AC impedance automatically switches to a low value when a high voltage AC transmit pulse on the transmit wire, and automatically switches to a high AC impedance when the AC voltage on the transmit wire drops below a limit value.

23. An ultrasound pulse echo array transceiver system according to claim 22, where the switching component of the transmit switch is made of at least one diode.

24. An ultrasound pulse echo array transceiver system according to claim 21, where at least one electronic transmit switch can be switched on or off by a transmit switch control voltage.

25. An ultrasound pulse echo array transceiver system according to claim 24, where the switching element of the transmit switches with explicit control voltages is made of diodes or switching transistors.

26. An ultrasound pulse echo array transceiver system according to claim 21, where the electronic circuit contains at least two transmit switches connected to at least two transducer elements on the one terminal, and on the other terminal connected to the same transmit wire, possibly through electronic delay lines and/or buffer amplifiers that are part of the transceiver, where at least one of the transmit switches can be switched on or off by a control voltage, the transmit switch control voltages being selectable so that a group of active transmit transducer array elements can be selected, to select the width and the depth of focus of the active transmit aperture.

27. An ultrasound pulse echo array transceiver system according to claim 26, where the receive focus switches can selectively be switched on to select the receive aperture and focus, so that the combined transmit and receive beam form a narrow observation beam in defined depth ranges of the received signal.

28. An ultrasound pulse echo array transceiver system according to claim 27, where the received signal for each combined transmit and receive focus is used to measure or image in a depth range where the combined observation beam is narrow.

29. An ultrasound pulse echo array transceiver system according to claim 28, where the measurement or image is composed of a sequence of depth ranges with the transmit and receive foci selected for minimal width of the observation beam in each range.

30. An ultrasound pulse echo array transceiver system according to claim 26, where the transmit switch control voltages are selected in a sequence so that for a first transmit pulse, transducer elements with short focus depth is selected for the transmit aperture, and for a set of consecutive transmit pulses an increasing number of elements with deeper foci are connected, so that an increasing active transmit aperture with an increasing composite focus depth is obtained for each consecutive transmit pulse in the set.

31. An ultrasound pulse echo array transceiver system according to claim 30, where the transmit switch control voltages are selected by a transmit switch control voltage sequencer circuit part of the electronic circuit, in a sequence generated by either the high voltage AC transmit pulses at the transmit wire or special signaling from the ultrasound instrument on a signaling wire.

32. An ultrasound pulse echo array transceiver system according to claim 31, where the transmit switch control voltage sequencer is reset through special signaling on the transmit wire, for example a change in voltage level of the transmit wire over a period of time.

33. An ultrasound pulse echo array transceiver system according to claim 26, where the number of array elements connected to the transmit wire in the transmit period is controlled through signaling from the ultrasound instrument to the transceiver over at least one signaling wire.

34. An ultrasound pulse echo array transceiver system according to claim 26, where the control voltage to at least one transmit switch is derived from a high voltage AC transmit pulse at the input wire to the transmit switch.

35. An ultrasound pulse echo array transceiver system according to claim 26 where at least two of the bias, receive, transmit, and signaling wires are connected and merged to a single wire, to reduce the number of wires connecting the ultrasound instrument and the array transceiver.

36. An ultrasound pulse echo array transceiver system according to claim 26 where the bias, receive, transmit, and signaling wires are connected and merged to a single wire, so that a 2-wire cable including ground connection can be used for connection between the ultrasound instrument and the array transceiver.

37. An ultrasound pulse echo array transceiver system according to claim 17, where the number of array elements connected to the receive summing circuit is controlled through signaling from the ultrasound instrument to the transceiver over at least one signaling wire.

38. An ultrasound pulse echo array transceiver system according to claim 17, where the electronic circuit also contains a receive timing circuit for controlling the receive focusing switches, the receive timing circuit being reset at the pulse transmission and in a time sequence following the pulse transmission switches on the receive focus switches so that an increasing active receive aperture with increasing focus depth with time after the pulse transmission is obtained, to provide a dynamic focusing of the receive beam.

39. An ultrasound pulse echo array transceiver system according to claim 17 where at least two of the bias, receive, transmit, and signaling wires are connected and merged to a single wire, to reduce the number of wires connecting the ultrasound instrument and the array transceiver.

40. An ultrasound pulse echo array transceiver system according to claim 17 where the bias, receive, transmit, and signaling wires are connected and merged to a single wire, so that a 2-wire cable including ground connection can be used for connection between the ultrasound instrument and the array transceiver.

41. An ultrasound imaging device for imaging of structures through narrow channels, where an ultrasound transceiver system according to claim 12 is mounted at the tip of an elongated insertion device and connected to an ultrasound imaging system through a small number of wires.

* * * * *